United States Patent [19]

Meyer et al.

[11] Patent Number: 4,631,338
[45] Date of Patent: Dec. 23, 1986

[54] PROCESS FOR THE ISOLATION OF THERMOPLASTIC POLYCARBONATE FROM SOLUTION WITH VAPOR OF BENZENE OR ALKYLBENZENE

[75] Inventors: Karl-Heinrich Meyer, Krefeld; Uwe Hucks, Alpen; August Horsthemke, Krefeld, all of Fed. Rep. of Germany

[73] Assignee: Bayer Aktiengesellschaft, Leverkusen, Fed. Rep. of Germany

[21] Appl. No.: 762,209

[22] Filed: Aug. 5, 1985

[30] Foreign Application Priority Data

Aug. 16, 1984 [DE] Fed. Rep. of Germany ....... 3429960

[51] Int. Cl.$^4$ ............................................. C08G 63/62
[52] U.S. Cl. .................................... 528/483; 528/196; 528/198; 528/497
[58] Field of Search ................. 528/497, 196, 198, 483

[56] References Cited

U.S. PATENT DOCUMENTS

| 3,022,271 | 2/1962 | Darr et al. | 260/47 |
|---|---|---|---|
| 3,112,292 | 11/1963 | Bottenbruch et al. | 260/47 |
| 3,264,262 | 8/1966 | Baker et al. | 260/47 |
| 3,264,263 | 8/1966 | Baker et al. | 260/47 |
| 3,264,264 | 8/1966 | Baker | 260/47 |
| 3,322,724 | 5/1967 | Schnell et al. | 260/47 |
| 3,427,370 | 2/1969 | Schnell et al. | 264/37 |
| 3,437,638 | 4/1969 | Bottenruch et al. | 260/47 |
| 3,454,526 | 7/1969 | Rellensmann et al. | 260/47 |
| 3,505,273 | 4/1970 | Cleveland et al. | 260/33.8 |
| 4,184,911 | 1/1980 | Koda et al. | 159/47 |
| 4,212,967 | 7/1980 | Govoni et al. | 528/500 |

FOREIGN PATENT DOCUMENTS

| 808488 | 2/1959 | United Kingdom . |
| 861918 | 3/1961 | United Kingdom . |
| 2047720 | 12/1980 | United Kingdom . |

OTHER PUBLICATIONS

H. Schnell, "Chemistry and Physics of Polycarbonates", 1964, Interscience Publishers, N.Y., London, Sydney, pp. 41–44.

Primary Examiner—Harold D. Anderson
Attorney, Agent, or Firm—Gene Harsh; Joseph C. Gil; Aron Preis

[57] ABSTRACT

The present invention relates to the isolation of thermoplastic polycarbonates from their solutions by treating the organic solutions, obtained in the phase boundary processes, of the thermoplastic polycarbonates with vapors of benzene or alkylbenzenes.

9 Claims, No Drawings

PROCESS FOR THE ISOLATION OF THERMOPLASTIC POLYCARBONATE FROM SOLUTION WITH VAPOR OF BENZENE OR ALKYLBENZENE

In the known preparation of thermoplastic aromatic polycarbonates by the two-phase boundary process, the polycarbonates are obtained in the organic phase, from which they must be isolated after this has been separated off and purified. (See, for example, H. Schnell, "Chemistry and Physics of Polycarbonates", 1964, Interscience Publishers, New York, London, Sydney, pages 41 to 44).

For the polycarbonate based on bisphenol A, which is industrially the most important polycarbonate, there are the following possibilities: one possibility for the isolation comprises precipitation of the polycarbonate from its solutions by non-solvents (see, for example, U.S. Pat. Nos. 3,264,262, 3,264,263 and 3,264,264). Toluene, inter alia, is mentioned here as a non-solvent.

The precipitation method has the disadvantage that the powder obtained must be dried and made up into free-flowing granules, which can cause difficulties if precipitation has not been carried out properly. The recovery of the solvent for the polycarbonate and the loss of polycarbonate due to non-quantitative precipitation are technological disadvantages.

An isolation method which is different in principle leads directly to a polycarbonate melt via evaporation of the solvent (see, for example, U.S. Pat. No. 3,022,271, DE-OS (German Published Specification) No. 1,404,984 and DE-AS (German Published Specification) No. 1,209,741). There is the danger here of damage to the polycarbonate, since the last residues of solvent are removed at relatively high temperatures.

The solvent content of polycarbonate solutions can also be reduced by means of water (see U.S. Pat. No. 3,505,273).

It is also possible to add monochlorobenzene or polyhydric alcohols or aqueous solutions of these polyhydric alcohols to the polycarbonates in amounts of 0.1 to 10% by weight before extrusion thereof to remove solvent residues from polycarbonates (see DE-OS (German Published Specification) No. 2,917,396).

Another method for isolating polycarbonate comprises crystallisation of polycarbonates from their solutions, which is promoted by concentrating the solutions at elevated temperature and/or reduced pressure, or adding non-solvents (see U.S. Pat. No. 3,112,292, in particular column 3, paragraph 3). Solvents for the polycarbonate which are recommended here are also, inter alia, benzene, toluene and xylene, although this does not apply to polycarbonates based on bisphenol A, but, for example, to polycarbonates from chlorinated bisphenols (see Example 4 of U.S. Pat. No. 3,112,292).

Similar processes are described in the Japanese publications Nos. 78-137,297 and 78-137,298 of Mitsubishi Gas, wherein polycarbonate solutions are modified by adding non-solvents so that they solidify. Needless to say, benzene, toluene and xylene, inter alia, are mentioned as non-solvents, toluene being effective as a particularly suitable non-solvent.

DE-OS (German Published Specification) No. 2,825,857 describes a particular process for the preparation of polycarbonate from polycarbonate solutions, wherein the solvent is evaporated and the polycarbonate obtained is powdered immediately. Suitable solvents for polycarbonates are chlorinated, aliphatic hydrocarbons and pyridine. Aromatic hydrocarbons, such as benzene, chlorobenzene and toluene, can be admixed in order to facilitate powdering of the polycarbonate. Toluene is co-used in the examples.

A further development of the process of U.S. Pat. No. 3,112,292 is described in U.S. Pat. No. 3,322,724, where solid polycarbonates instead of non-solvents are added to the polycarbonate solutions in order to cause crystallisation of the polycarbonate. Solvents for the polycarbonate which are mentioned are, inter alia, benzene, toluene and xylene, in addition to others, but these again are not suitable for polycarbonates based on bisphenol A (in this context, see, for example, the embodiment examples of U.S. Pat. No. 3,322,724).

In DE-AS (German Published Specification) No. 1,100,949, pulverulent polycarbonates are prepared by swelling already isolated polycarbonates with a small amount of organic solvents. Organic solvents mentioned here are benzene, toluene and xylene, inter alia, but these are again presented as bisphenol A polycarbonate non-solvents and thus convert the bisphenol A polycarbonate only into a powder in accordance with the process of DE-AS (German Published Specification) No. 1,100,949.

Another process for isolating polycarbonates from their solutions comprises treating the polycarbonate solutions with steam, which virtually completely vaporises the solvent (see, for example, U.S. Pat. No. 3,427,370 and European Published Application No. 0,003,996).

Finally, there is also the possibility of preparing the polycarbonate immediately in solid form if the reaction is carried out with phosgene in the presence of aromatic, optionally chlorinated hydrocarbons, surface-active substances and aqueous alkali solution (see the Japanese Patent Application of the Kunoshima Chem. Ind. No. 16907/59 of 25.5.1959, published on 16.12.1966, No. 21472/66).

All these isolation methods still have this or that technological disadvantage, so that there is still a certain need for improvement in the process for isolating polycarbonates based on bisphenol A whilst retaining the good product quality.

The present invention thus relates to a process for the isolation of thermoplastic polycarbonates based on bisphenol A from their solutions, which is characterised in that the purified polycarbonate solutions, prepared in a known manner by the phase boundary process, in organic solvents, preferably in aliphatic chlorinated hydrocarbons, are treated with vapours of benzene or alkylbenzenes, in which the thermoplastic polycarbonate based on bisphenol A is sparingly soluble or insoluble at room temperature and which also in each case have a higher boiling point than the solvent to be evaporated off from the polycarbonate solutions resulting from the phase boundary process, the treatment with the vapours being continued until the solvent to be evaporated off is evaporated off down to a residual content of less than 0.5% by weight, preferably of less than 0.1% by weight, based on the total weight of the resulting polycarbonate/benzene or alkylbenzene mixture, and in that the polycarbonate is isolated as a melt from the resulting mixture by evaporating off the benzene or alkylbenzene in known apparatuses, pressure being applied.

Examples of alkylbenzenes which are suitable according to the invention are toluene, ethylbenzene and the various xylenes. Mixtures of benzene with alkylbenzenes are also suitable. Toluene is particularly preferred.

"In which the thermoplastic polycarbonate is sparingly soluble or insoluble at room temperature" in the context of the process according to the invention means that the thermoplastic polycarbonate based on bisphenol A has a solubility of less than 3% by weight, based on the weight of benzene or alkylbenzene, at room temperature (20° C.).

"Have a higher boiling point" in the context of the process according to the invention means that the benzene or the particular alkylbenzene to be selected must have a boiling point under normal pressure at least 20° C. higher than the particular organic solvent employed in the phase boundary process.

The polycarbonate/aromatic mixtures obtained according to the invention can be worked up completely by evaporation at high temperatures without damage to the polycarbonate or the apparatus. The resulting polycarbonates are distinguished by their light colour.

Examples of suitable apparatuses for the process according to the invention are columns, bubble columns or cascades of stirred containers.

The process according to the invention is particularly advantageously carried out continuously in a column in which the vapour of the aromatic is blown in from the bottom and the polycarbonate solution resulting from the phase boundary process is introduced at the top. The polycarbonate/benzene or alkylbenzene mixture is drawn off continuously from the bottom of the column. The particular organic solvent used in the phase boundary process is continuously taken off in vapour form at the top of the column. The temperature programme in the column can be derived from the phase equilibrium curve of the particular organic solvent in the phase boundary process and the particular aromatic used. The temperature range for the polycarbonate solution to be fed in can be between 20° C. and 100° C., and that of the vapour of the aromatic can be between 80° C. and 200° C.

The particular temperature level can be modified by applying different increased pressures.

Slight increased pressures are advantageously chosen, so that the operating conditions in the plants are not close to the limit of the unstable region of the mixtures.

In the case of polycarbonate based on bisphenol A where methylene chloride is replaced by toluene, pressures of 1 to 5 bar absolute are sufficient. The temperatures are about 41°–100 °C. at the inlet point for the polycarbonate/methylene chloride solution and about 112°–195° C. at the inlet point for the toluene vapour. Pressures of 1.5 to 3 bar absolute are preferably established.

The concentrations of polycarbonate in the polycarbonate solution to be fed in are between 3 and 30%, preferably between 10 and 25%. They are usually hardly varied by conversion by means of the aromatic vapour treatment according to the invention into the polycarbonate/benzene or alkylbenzene mixtures. Because of the energy balance, the concentrations may drop slightly, remain the same or increase. If desired, there is the possibility of establishing higher polycarbonate concentrations in the polycarbonate/benzene or alkylbenzene mixtures by supplying additional energy.

Since the polycarbonate is isolated via evaporation, the resulting vapour of the benzene or alkylbenzene can be utilised directly for evaporating off the organic solvent used in the phase boundary process.

Thermoplastic polycarbonates based on bisphenol A in the context of the present invention are those with $\overline{M}w$ between 10,000 and 200,000, preferably between 20,000 and 80,000 ($\overline{M}w$ determined via the method of light scattering).

Polycarbonates based on bisphenol A are, on the one hand, bisphenol A homopolycarbonate or those bisphenol A copolycarbonates which, in spite of co-using other difunctional components, have the abovementioned poor solubility at room temperature in benzene or in alkylbenzenes of less than 3% by weight.

Examples of other suitable difunctional components are diphenols other than bisphenol A, such as, for example, 2,2-bis-(3,5-dibromo-4-hydroxyphenyl)-propane.

Other difunctional components are, for example, also oligomers or polymers which carry two end groups which are capable of undergoing a build-up reaction under the conditions of polycarbonate synthesis by the phase boundary process. Examples of such end groups are phenolic OH groups, chlorocarbonic acid ester groups and carboxylic acid chloride groups. Previously prepared oligomeric or polymeric blocks which already carry the reactive groups mentioned as a result of the nature of their preparation or in which such groups can be produced by a suitable after-treatment are, for example, polycondensates based on aliphatic diols and saturated aliphatic dicarboxylic acids, such as, for example, saturated aliphatic polyesters on a dimeric fatty acid basis (see, for example, U.S. Pat. No. 4,430,492 or DE-OS (German Published Specification) No. 2,935,317) or also polysiloxanes (see, for example, U.S. Pat. Nos. 3,419,634, 3,821,325 and 3,832,419).

The phase boundary process for the preparation of the thermoplastic aromatic polycarbonates to be isolated according to the invention is known from the literature.

Especially suitable solvents for the phase boundary process which give polycarbonate solutions which are particularly suitable for the isolation process according to the invention are, in particular, aliphatic, halogenated hydrocarbons, such as, for example, $CH_2Cl_2$ or 1,1-dichloroethane. $CH_2Cl_2$ is especially suitable.

Known apparatuses for evaporating off the benzene or the alkylbenzenes are, for example, thin film evaporators and devolatilisation extruders.

The polycarbonates isolated by the process according to the invention are light-coloured products and are thus advantageously suitable for use in all the fields of application of polycarbonates.

They can be provided with the stabilisers, additives and fillers known in the chemistry of thermoplastic polycarbonates in a known manner.

They can be shaped to the customary shaped polycarbonate articles, such as semi-finished products, sheets, films and fibres, in a known manner.

EXAMPLE 1

107 kg/hour of a 16.4% strength polycarbonate/methylene chloride solution which has been prepared by the phase boundary process are introduced at the top of a distillation column with a diameter of 200 mm and a height of 3,000 mm. 106 kg/hour of toluene vapour are passed in at the bottom. The column is operated under normal pressure. 41° C. is measured at the top of the column and 113° C. is measured at the bottom. The distillate contains 0.43% of toluene; 250 ppm of methylene chloride are found in the polycarbonate/toluene mixture.

The polycarbonate/toluene mixture is pumped into a thin film evaporator operated under an increased pressure of 1.2 bar, and 65.5 kg/hour of toluene are distilled off. The concentrated mixture is freed from the toluene in a devolatilisation extruder.

A polycarbonate with the following characteristic parameters is obtained:

| relative viscosity | $\eta$rel. | 1.307 |
|---|---|---|
| (0.5 g in 100 ml of methylene chloride) | | |
| hydrolysable chlorine | [ppm] | <2 |
| phenolic OH | [%] | 0.01 |
| inorganic chlorine | [ppm] | <2 |
| total chlorine | [ppm] | <2 |
| colour number* | | 0.05 |

*The colour number is an empirical relative characteristic figure. This is defined such that 0.05 units allow a visually perceptible graduation against the light at a test bar thickness of 4 mm.

EXAMPLE 2

The example shows the extent to which polycarbonate is damaged by halogenohydrocarbons at high temperatures.

20% strength polycarbonate solutions with various solvents were heated at high temperatures in an autoclave with a sample of material 1.4571 for 4 hours. The solutions were then taken out of the autoclave, the solvents were removed in a vacuum drying cabinet and the polycarbonate film was dissolved to give a 5% strength solution in pure methylene chloride, in order to detect differences via the colour number of the solution.

| Solvent | Temperature | Hazen colour number |
|---|---|---|
| Methylene chloride | 225° C. | >300 |
| Chlorobenzene | 320° C. | 80–90 |
| Toluene | 315° C. | 20–30 |

As an advantageous variant of the process according to the invention, it has also been found that the resulting polycarbonate/benzene or alkylbenzene mixtures give, by cooling, solidified mixtures from which the benzene or the alkylbenzenes can be removed virtually quantitatively by drying.

The present invention thus also relates to a process for the isolation of thermoplastic polycarbonates based on bisphenol A from their solutions, which is characterised in that the purified polycarbonate solutions, prepared in a known manner by the phase boundary process, in organic solvents, preferably in aliphatic chlorinated hydrocarbons, are treated with vapours of benzene or alkylbenzenes, in which the thermoplastic polycarbonate based on bisphenol A is sparingly soluble or insoluble at room temperature and which also in each case have a higher boiling point than the solvent to be evaporated off from the polycarbonate solutions resulting from the phase boundary process, the treatment with the vapours being continued until the solvent to be evaporated off is evaporated off down to a residual content of less than 0.5% by weight, preferably of less than 0.1% by weight, based on the total weight of the resulting polycarbonate/benzene or alkylbenzene mixture, and in that the resulting mixture is solidified, preferably after concentration, and the benzene or alkylbenzene is then removed by drying.

"Solidification" in the context of the process according to the invention means that the liquid polycarbonate/benzene or alkylbenzene mixtures obtainable after the vapour treatment are converted into "semi-solid dispersions" by reducing the temperature and, if appropriate, also by reducing the pressure, evaporation of the benzene or alkylbenzene being excluded, and these dispersions can be converted into crumbly masses. During this solidification operation, the temperature of the mixture is in each case below the boiling point of the benzene or alkylbenzene at the particular pressure applied.

Examples of suitable apparatuses for the solidification of the polycarbonate/benzene or alkylbenzene mixtures are cooled extruders, cooled kneaders, cooling rollers and cooling belts. Cooled extruders and cooled kneaders are preferably used.

The liquid polycarbonate/benzene or alkylbenzene mixtures suitable for the "solidification" should contain concentrations of 3 to 70% by weight of polycarbonate, preferably 30 to 70% by weight of polycarbonate, in the mixture.

If necessary, these concentrations are established in the customary evaporation apparatuses for viscous solutions, such as, for example, thin film evaporators, multiphase spiral tubes and falling film evaporators, by distilling off the benzene or alkylbenzene. The pressures to be applied here are 1 to 5 bar absolute. The temperatures which are thereby established can be obtained from the vapour pressure curve of the benzene or alkylbenzene.

The crumbled, semi-solid polycarbonate/benzene or alkylbenzene mixtures are freed from the benzene or alkylbenzene in known driers, such as, for example, plate driers, tumble driers and paddle driers. The temperatures to be applied are between 50° and 220° C., preferably between 100° and 200° C. The drying times are between 30 and 180 minutes, and are preferably 60 to 120 minutes, under normal pressure. The speed of drying can be accelerated by applying a vacuum.

It is advantageous to carry out the drying according to a temperature programme. This means that drying is carried out initially at a low temperature level of between 50° and 140° C., preferably at 100° to 130° C., and then at a higher temperature level of between 140° and 220° C., preferably between 160° and 200° C.

If the concentrations of the crumbled, semi-solid polycarbonate/benzene or alkylbenzene mixtures are between 3 and 30% by weight, preferably between 3 and 20% by weight, part of the benzene or alkylbenzene can be separated off in filter presses before drying. Concentrations of, for example, between 10 and 45% by weight, preferably between 30 and 40% by weight, can be established by this measure.

Solidified polycarbonate/solvent mixtures which contain solvents, such as, for example, methylene chloride, chlorobenzene and the like, by themselves or together or also in addition to benzene or alkylbenzenes, cannot be virtually quantitatively freed from the solvents by a simple drying process. The semi-solid polycarbonate/benzene or alkylbenzene mixtures obtained according to the invention exhibit decisive advantages here. Residual contents of benzene or alkylbenzene which are below the detectability limit are achieved.

The polycarbonates obtained according to the invention, after drying, are crumbs which are white in appearance, can be powdery to a greater or lesser degree and are virtually free from chlorine and benzene or alkylbenzene. They are advantageously suitable for use in all the fields of application of polycarbonates.

They can be provided with the stabilisers, additives and fillers known in the chemistry of thermoplastic polycarbonates in a known manner. They can be shaped in a known manner to the customary shaped polycarbonate articles, such as semi-finished products, sheets, films and fibres.

EXAMPLE 3

A polycarbonate/toluene mixture which has been obtained according to Example 1 and has been concentrated to 38% by weight in a thin film evaporator is introduced into a kneader cooled with water. After a few seconds, solidification of the mixture starts, and after 60 seconds the mass crumbles. The product is then dried under normal pressure at 120° C. for one hour and at 200° C. for a further hour. <10 ppm of toluene are found in the polycarbonate. The polycarbonate is melted in an extruder, drawn off as a bristle and granulated. The clear granules are injection-moulded to a test piece.

EXAMPLE 4

A polycarbonate/toluene mixture concentrated as in Example 3 is introduced into a water-cooled twin-screw extruder, the screws of which rotate in the same sense. After a residence time of 30 seconds, the product leaves the extruder as crumbs. After drying, as described in Example 3, <10 ppm of toluene are measured. The powder is processed to a test bar.

EXAMPLE 5

(Comparison)

A liquid polycarbonate/toluene/methylene chloride mixture consisting of 35% by weight of polycarbonate, 45% by weight of toluene and 20% by weight of methylene chloride is introduced into a kneader which is cooled with water. After about 120 seconds, the mixture starts to solidify, and after about a further 120 seconds, it crumbles. After drying, as described in Example 3, 255 ppm of toluene and <10 ppm of methylene chloride are found. The product is processed to a test bar.

EXAMPLE 6

(Comparison)

A liquid, 30 percent strength by weight polycarbonate/chlorobenzene solution is introduced into a kneader cooled with water. After about 15 minutes, solidification starts, and after about a further 5 minutes, the product crumbles. After drying, as described in Example 3, 730 ppm of chlorobenzene are found. The product is processed to a test bar.

We claim:

1. A process for the isolation of a thermoplastic polycarbonate based on bisphenol A, which is prepared by the phase boundary process, from a solution containing an organic solvent comprising (i) continuously treating a solution of said polycarbonate in said organic solvent with a vapor of at least one member selected from the group consisting of benzene and alkylbenzene, said member being characterized in that polycarbonate is sparingly soluble or insoluble therein at room temperature and further in that its boiling point is lower than that of said organic solvent, until said organic solvent is evaporated off down to a residual content of less than 0.5% by weight based on the total weight of the mixture of said polycarbonate and said member and (ii) isolating said polycarbonate either as a melt from said mixture by evaporating off said member under pressure or by solidifying said mixture and removing said member by drying.

2. A process according to claim 1, in which the organic solvent is evaporated off down to a residual content of less than 0.1% by weight, based on the total weight of the resulting polycarbonate/benzene or polycarbonate/alkylbenzene mixture.

3. The process of claim 1 wherein said alkyl benzene is selected from the group consisting of toluene, ethylbenzene and xylene.

4. The process of claim 2 wherein said alkyl benzene is toluene.

5. A process according to any of claims 1, in which the organic solvent is an aliphatic chlorinated hydrocarbon.

6. A process according to claim 5, in which the organic solvent is methylene chloride.

7. A process according to any of claim 1, in which the treatment with the vapour is carried out continuously in a column.

8. A process according to any of claim 1, in which, following treatment with the vapour, polycarbonate/benzene or polycarbonate/alkylbenzene mixture is solidified and the benzene or alkylbenzene is then removed by drying.

9. A process according to claim 8, in which the polycarbonate/benzene or polycarbonate/alkylbenzene mixture is solidified, after being concentrated to a concentration of 30 to 70% by weight.

* * * * *